Figure 1:
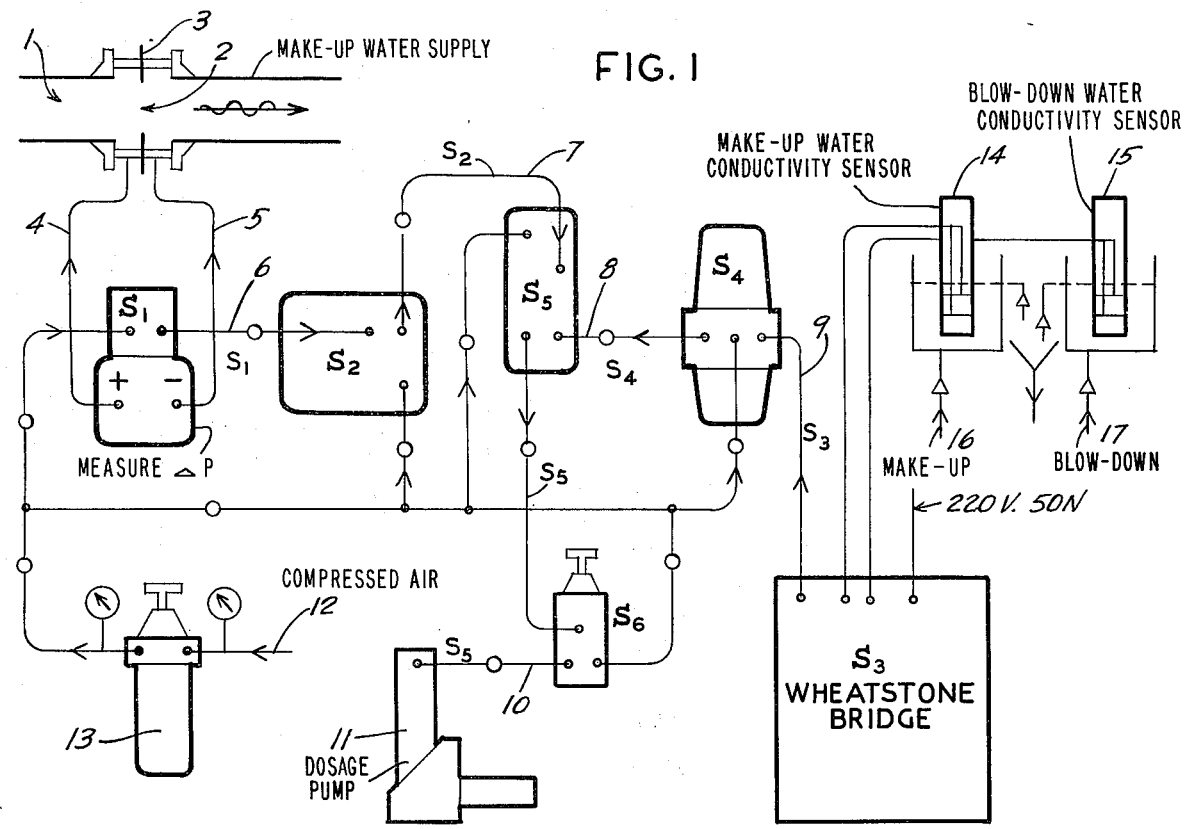

United States Patent [19]
Zamboni et al.

[11] 3,918,469
[45] Nov. 11, 1975

[54] CONTROLLING CONCENTRATION OF ADDITIVE IN AN EVAPORATIVE SYSTEM

[75] Inventors: Leopoldo Zamboni; Mauro Minervini; Marcello Zifferero, all of Rome, Italy

[73] Assignee: Nalco Chemical Company, Chicago, Ill.

[22] Filed: Apr. 11, 1974

[21] Appl. No.: 459,918

[30] Foreign Application Priority Data
Nov. 27, 1973 Italy.................................. 52806/73

[52] U.S. Cl. ........................ 137/5; 122/379; 137/93
[51] Int. Cl.² ......................................... G05D 11/08
[58] Field of Search .......... 122/379, 382; 137/5, 93; 210/96

[56] References Cited
UNITED STATES PATENTS

| | | | |
|---|---|---|---|
| 3,428,557 | 2/1969 | Rivers................................. | 137/5 X |
| 3,447,510 | 6/1969 | Rivers................................. | 122/382 |

*Primary Examiner*—Robert G. Nilson
*Attorney, Agent, or Firm*—Kinzer, Plyer, Dorn & McEachran

[57] ABSTRACT

Concentration of an additive in an evaporative system is monitored by measuring the conductivity ratio of the make up water and the blow down water, as one value, separately measuring the flow rate of the make up water as another value, obtaining the product of the two values (an analog) and adjusting a variable pump which delivers the additive in accordance with the analog.

12 Claims, 3 Drawing Figures

SYMBOLS
—o— air
—◁— water

KEY:
a,a' = MAKE-UP WATER SUPPLY
b = SAMPLE OF MAKE-UP WATER
c = SAMPLE OF BLOW-DOWN WATER
d = RETURN WATER WITH ADDITIVE

CONTROLLING CONCENTRATION OF ADDITIVE IN AN EVAPORATIVE SYSTEM

The present invention relates to a device for continuously controlling the dosage of chemical additives in evaporative systems, and to the plants with more than one evaporative system controlled by said device. More particularly, this invention relates to a device, for continuously controlling the dosage of the chemical additives normally fed to the evaporative systems, capable of maintaining the concentration of the additives in the water of the system equal to a predetermined optimal value.

It is known that in the industrial plants where manufacturing, extracting or refining processes are carried out, systems are applied in which a liquid, mostly water or water solution, is recirculated, and subject to evaporation.

Exemplary of this type are the cooling systems currently used in the chemical, petrochemical industry, in air conditioning plants, in power generation, and so on, where the heat to be removed is transferred through surface heat exchangers to the continuously circulating cooling water which is subsequently cooled in evaporative towers, spray ponds and similar devices.

Among these systems it is possible to cite also the steam boilers where the feed water, because of evaporation, becomes strongly concentrated before being blown out with the mud.

It is possible to cite eventually also the continuous distillation plants fed with aqueous solutions, for instance the sea water evaporators.

It is to be noted that the drawbacks found in the evaporative systems of the cited kind, at present adopted are frequent. These drawbacks are due to corrosion phenomena, scale formation, sticky sludge formation, microbial vegetation, foaming and so on.

In order to overcome this situation, chemical additives of various kinds have been proposed and are at present used, said additives being technologically suitable to solve or to attenuate one or more of the aforesaid problems. However, in order to have said additives carry out an effective action, it is necessary that they keep constant concentration in the aqueous medium, equal to a pre-established value and varying according to the case.

There derives the need for a control to be carried out discontinuously at predetermined intervals, by means of analyses of samples taken out from the circulating aqueous stream, or of discontinous controls of values depending upon the concentration, and consequent government of the members adjusting the rate of flow of the make up water and/or of the chemical additive, such a procedure excluding of course the assurance of having a concentration steadily and continuously constant of the additive in the aqueous stream circulating through the evaporative system, or anyway, the possibility of continuously carrying out a control of such a concentration, with the consequent possibility of the occurrence of some (corrosion, scale formation, etc.) of the already cited drawbacks.

Furthermore, when the chemical additives proposed for this purpose by the present art, which is constantly changing, due to rapid and continuous progress, it is necessary to suit the cited analysis systems to the arrangement of new equipment, use of different means or devices, and this is certainly not free of difficulties.

Moreover, the most effective types of additives, used at present, require sophisticated techniques of analysis, which at the present state of the art cannot be automated.

Other methods adopted by the present art in order to overcome these drawbacks consist substantially in: a) limiting the concentration ratio, by operating a blow down valve when the electric conductivity of the water in the circulating stream surpasses a pre-fixed value and simultaneously starting the dosage pump for the additive.

b. Adjusting the flow rate of the pump dosing the additive, according to the signal from an instrument capable of measuring the corrosivity of the water stream.

However, both these techniques are not free from inconveniences, and particularly:

The system according to (a) has remarkable applicability restrictions, as it can only be used in essentially closed cooling systems, namely in those systems where the blow down rate is adjusted exclusively with a suitable valve, as in the case of the evaporative towers of air conditioning plants; consequently this system cannot be used in those technically important sytems having a great diffusion, as the tower evaporative plants of petrol-chemical plants which due to uncontrollable water losses, tend to diminish spontaneously their concentration, preventing thus a control of this kind;

The system shown in (b) is based on the response of an instrument which detects only one of the variable values involved in the problem and precisely the corrosion, which sometimes is not the most important variable value; moreover, the probe destined to display the minimum variations of voltage depending upon the state of corrosivity, as it is continuously immersed in the water stream, is excessively exposed to the secondary effects due to pollution from algae, hydrocarbons, mud, etc., and therefrom derives the unreliability of the signal transmitted under these conditions.

Accordingly, the purpose of the present invention is that of providing a device which eliminates or reduces substantially these inconveniences, allowing a continuous control of the dosage of the chemical additive in the evaporative systems to be operated, so as to keep a steadily constant concentration of said additive in the aqueous fluid therein circulating, equal to a predetermined value, variable according to the plant and/or the used additive.

Another purpose of the present invention is that of embodying a control device for the dosage of the additive, independent of the additive type used.

A further purpose is that of embodying a control device of the related kind, the possibility of application of which will not be restricted by the type of evaporative system, and being capable of being advantageously used also in imperfectly closed systems.

The device according to the present invention has also the advantage of not being tied to the measuring of a value, function of one only of the variable values examined, for instance the corrosion and of continuously directly controlling the concentration additive/water ratio.

Another advantage is that of the independence of the signal communicated to the control system, from the conditions or the effects inside the evaporative system.

Other advantages and purposes of the present invention will appear clearly from the following specification.

For a more complete disclosure of the control device according to this invention, let us recall a few fundamental elements concerning the parameters, the variables and the relations thereof, in the case of evaporative systems.

Let $F_m$, $F_v$ and $F_s$ be the flow rates of the make up water, of the vapor and of the blow down, and $S_m$, $S_s$ the salt concentration of the make up water and of the blow down water, then:

(1) $$F_m = F_v = F_s; \quad \frac{S_m}{S_s} = \frac{F_s}{F_m}$$

the last equality to be considered true only in steady state conditions and in the absence of precipitation or gas evolution phenomena.

If $d$ denotes the concentration of the additive which must be kept constant in the system, then the rate of flow of the additive will have to comply with:

2.  $$F_d = d \times F_s$$

where $F_s$ has the above specified meaning, and represents, more particularly the total flow rate of the liquid which is removed from the system, not only through the proper blow down valve, but also due to the unavoidable and unpredictable losses through various leakages, ventilation leakages, etc., whereby it is practically impossible to obtain a precise and direct measuring thereof.

On the contrary, $F_m$ is a variable which can be easily controlled with sufficient precision, since the make up water is fed through one inlet duct alone which can be provided with suitable flow rate instruments.

As to the ratio $S_s/S_m$ (salinity ratio), it is known, as it is a function (for not too high values of the ratio, when for instance $S_m$ is not much higher than 5000 ppm) of the values of the relative electric conductivity $K_s$ and $K_m$ of the respective liquid mediums, whereby it is possible to write (within the limits of interest for the related problems)

$$\frac{F_m}{F_s} = \frac{S_s}{S_m} = \frac{K_s}{K_m}$$

that is $$F_s = F_m \frac{K_m}{K_s}$$

and therefore for $F_d$ we shall have:

$$d \times F_s = d \times F_m \times \frac{K_m}{K_s}$$

From the above disclosure it is to be remarked that the disclosure it is to be remarked that the device for the continuous control of the dosage of chemical additives according to this invention includes means to materialize the above relation (3).

Accordingly, the specific object of this invention is a device for the continuous control of the dosage of chemical additives in evaporative systems, characterized in comprising in combination:

Means for continuously measuring the make up water flow rate ($F_m$) of the evaporative system, and for transmitting the pnuematic signals indicating the measured rate of flow and linear with respect thereto;

Means for continuously measuring the ratio $$\frac{K_m}{K_s}$$

of the relative electric conductivities of the make up water and of the blow down water and for transmitting pneumatic signals indicative of the measured value and linear with respect thereto;

Analog means for multiplying said two pneumatic signals indicative of the values of $F_m$ and $$\frac{K_m}{K_s}$$

and for transmitting pneumatic signals indicative of the product of the inlet signals and linear therewith;

Pump means with variable stroke for feeding the chemical additives with a pneumatic governor of said stroke, controlled by said pneumatic outlet signal from said analog means.

Particularly, said means for continuously measuring the rate of flow $F_m$ can consist of a transmitter or transducer of the differential pressure generated at a calibrated orifice obtained by a gauged flange inserted in the make up water inlet pipe, with an instrument destined to linearize said signal indicating a pressure differential and accordingly proportional to the square of the rate of flow.

Another preferred embodiment of the measuring means for $F_m$ consists of a counter of the electrical pulses generated by an electromagnetic meter for the rate of flow associated to suitable electropneumatic devices for transforming the signal and to the devices for linearizing the signals.

In the preferred solution suggested by this invention, the means for continuously measuring the $$\frac{K_m}{K_s}$$

ratio consist of two equal conductivity cells, each fed with a continuous sampling of the make up water, and of the blow down water; said cells are the two contiguous sides of a Wheatstone bridge, the third side of which consists of a manually variable resistor for calibration, while the fourth side consists of a variable resistor to be adjusted by a zeroing device which can be for instance a "resolver" energized by the sensing diagonal of the bridge, or a pneumatic cylinder operated by solenoid valves, equally energized by the sensing diagonal. This "resolver" can be embodied so as to generate a current signal linear with the resistor forming the fourth side of the bridge, and therefore with the conductivity ratio, namely with the ratio of the resistors forming the first two sides and finally with the concentration ratio.

In case the resistor of the fourth side is set by a pneumatic cylinder, it will be easy to derive therefrom a pneumatic signal linear with said resistor and therefore with the concentration ratio. Of course, should the bridge outlet signal be an electric current, this will be preferably converted to a pneumatic signal through one of the currently available devices.

As to the analog means for muliplying the linear indicating signals for the values of $F_m$ and $$\frac{K_m}{K_s}$$

these means consist preferably of an analog multiplier, into which the two functions ($F_m$ and $K_m/K_s$) to be multiplied are introduced in the form of two pneumatic signals linear with the functions, and the multiplier emits another pneumatic signal linear with the product of the inlet functions. If the two incoming signals are the pneumatic outlet signal from the $F_m$ flow rate metering means, and the outlet pneumatic signal from the fourth side of the Wheatstone bridge, then the pneumatic outlet signal from the analog multiplier will be linear with the desired flow rate of the chemical additive.

This last cited signal, as aforesaid, will be transferred to the positioning member of the variable stroke pump which feeds the additive to the evaporative system.

A different embodiment is allowed by the intrinsic properties of the Wheatstone bridge. More exactly, it is known that if $R_1$ and $R_2$ are the resistances of two contiguous conductivity cells, $R_3$ the manual setting resistor and $R_4$ the bridge zeroing resistor, then it shall be $$R_4 = R_3 \times \frac{R_2}{R_1}$$

Now, if $R_3$ instead of being a manually adjusted resistor, can be positioned by a pnuematic device, linear with the make up flow rate $F_m$, $R_4$ shall be:

$$R_4 = K \times F_m \times \frac{K_m}{K_s} = k \times F_s$$

which means that $R_4$ (and the pneumatic signal linear with it) shall no longer be proportional to the plain concentration ratio, but also to the make up water flow rate and therefore (5) to the blow down water flow rate, thus making the analog multiplier superfluous.

In this case, in fact, the outlet signal from the fourth side ($R_4$) of the Wheatstone bridge, transformed by a pneumatic positioning governor associated to $R_4$, will be sufficient to adjust the position of the variable stroke of the dosage pump for the additive, and in this case the Wheatstone bridge acts as a metering device for the blow down flow rate.

This solution allows a remarkable simplification of the structure of the control device for the dosage of the chemical additive, according to this invention, since one of the components will be dispensed with, namely the analog multiplier, and deriving the control for the pump from the sole outlet signal from the fourth side of the bridge.

Another alternative for the purposes of this invention is that of materializing the function:

$$F_d = d \times F_m \times \frac{K_m}{K_s}$$

by using a feeding pump for the additive the variable stroke of which is continuously adjusted by the inlet signal coming from the continuous metering device for $F_m$ and the variable speed of the pump driving motor by the inlet signal coming from the metering device for the ratio $K_m/K_s$ or vice-versa.

The device for the continuous control of the dosage of the additive in any of the above disclosed solutions, can be advantageously used, as it will be more precisely described hereinafter, for the continuous control and adjustment of the feeding of an additive to different evaporative systems of a single plant.

Figure 2:
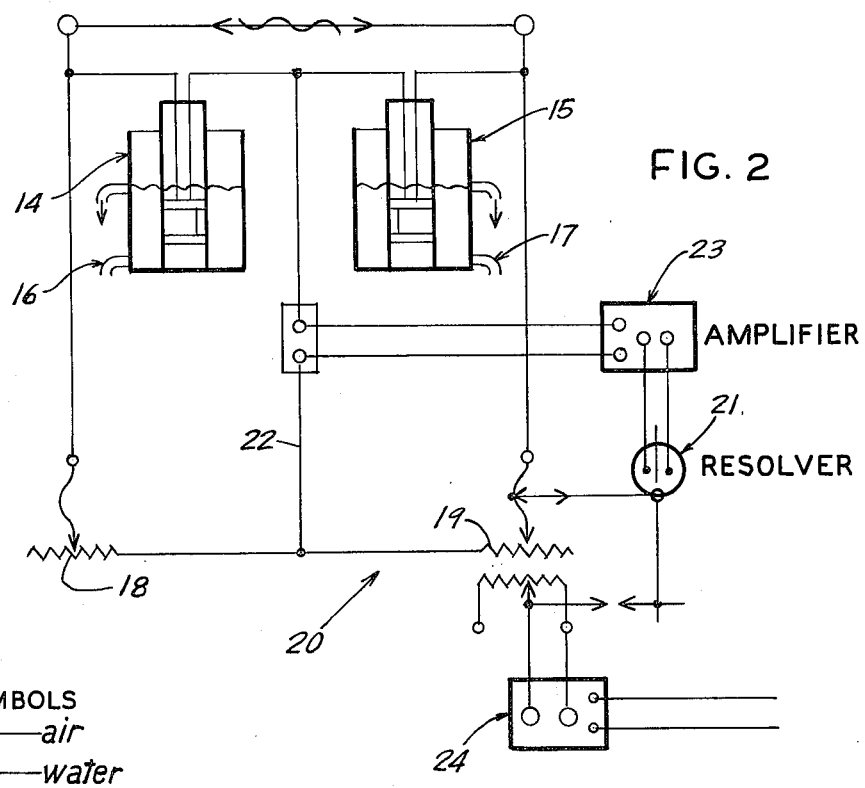
Figure 3:
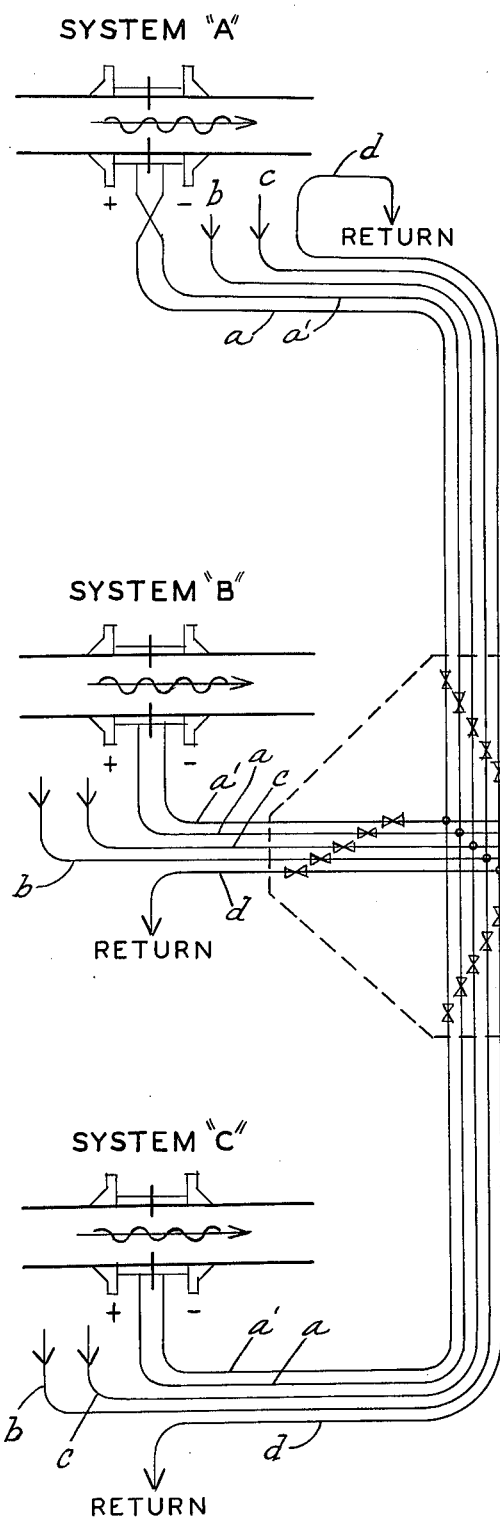
Figure 3:
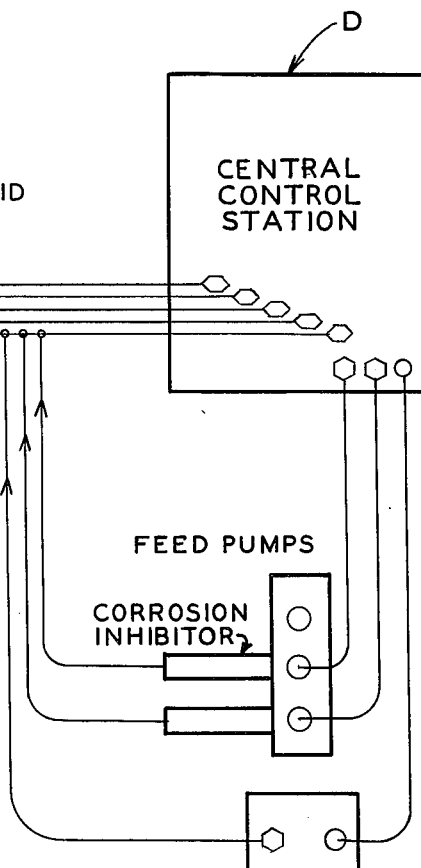

The present invention will now be described with reference to certain specific embodiments thereof, disclosed by way of non limitative example, in the attached drawings wherein:

FIG. 1 shows diagrammatically an evaporative system provided with the device for controlling the dosage of the chemical additive according to this invention;

FIG. 2 shows the device with the Wheatstone bridge for measuring the ratio of the conductivities $K_m/K_s$ as used according to this invention in the system of FIG. 1, and FIG. 3 is a plant for controlling the dosage of the additive, operating on three different evaporative systems. stream signal With particular reference to the drawings: in FIG. 1 a duct for the make up water has been shown provided with a calibrated orifice 2 defined by a bored disc or flange 3. The two faces of the disc are connected by pipes 4 and 5 to an instrument $S_1$ which detects the pressure differential $\Delta p$ along the fluid stresm of the make up water in the duct 1 upstream and downstream of the calibrated orifice 2, said pressure differential being proportional to the square of the flow rate of the make up water. The outlet signals ($s_1$) from the instrument $S_1$ will be transmitted along the duct 6 to an instrument $S_2$ which linearizes said signal to $S_2$ and this signal $s_2$ will be transmitted along 7 to a multiplier device $S_5$ of pneumatic type to which along 8 a signal ($s_4$) will be supplied, this signal $S_4$ being proportional to the ratio of the conductivities $K_m/K_s$ and therefore to the ratio of the concentrations $S_m/S_s$ as measured in the Wheatstone bridge device $S_3$. The pneumatic signal $s_4$ is obtained from the electric signal $s_3$ directly issuing from $S_3$ due to the transformation effected in the instrument $S_4$ to which the signal arrives along 9. The multiplier device $S_5$ multiplies the signals $s_2$ and $s_4$ and its outlet signal $s_5$ after a suitable reversal in $S_6$ will be transmitted along 10 to the dosage pump 11 for the chemical additive. The compressed air necessary for the operation of the device will be fed at 12 through a pressure governor 13 through the suitably marked ducts shown in the figure.

As to the Wheatstone bridge device $S_3$ for measuring the concentration ratio $K_m/K_s$, this device is diagrammatically also shown in FIG. 2, where only the two cells 14 and 15 have been illustrated, said cells being destined to measuring the electric conductivities $K_m$ and $K_s$ of the make up water, and of the blow down water, respectively, said water being supplied to the cells at 16 and 17. Said cells, as aforesaid, form two contiguous sides of the bridge. The device $S_3$ is more clearly shown in FIG. 2 where, besides the cells 14 and 15 must be noted also the other two sides of the bridge formed by a manually variable resistor 18 and by a fourth variable resistor 19, which can be "adjusted" by a zeroing device 20 consisting of a "resolver" 21, energized by the sensing diagonal 22 of the bridge, through the amplifier 23.

The cited zeroing device determines the position of a potentiometer 24, the output from which is a 4–20 mA current proportional to the ratio of the conductivities $K_m/K_s$.

By way of example the data related to a sequence of test operations are as follows:

| $F_m$ (cu.mt/hr) | 0 | 10 | 15 | 20 | 30 |
|---|---|---|---|---|---|
| $s_1$ (kg/sq cm) | 0.2 | 0.29 | 0.40 | 0.55 | 1.00 | the signal $s_1$ corresponding to the function: $s_1 > 0.2 + 0.8\ (F_m/3.0)_2$

By the linearization in $S_2$ the signal $s_1$ will be transformed into a linear signal $s_2$:

$$s_2 = \sqrt{(s_1 - 0.2) + 0.2} = 0.2 + 0.8 \times \frac{F_m}{30}$$

As to the measures of the conductivity ratio effected with the Wheatstone bridge at $S_3$, when these ratios vary from 0 to 1 the values of the output signal $s_3$ will be comprised between 4 and 20 mA, for instance as follows:

| $K_m$ | ppm | 200 | 200 | 200 | 200 |
|---|---|---|---|---|---|
| $K_s$ | ppm | 200 | 400 | 500 | 800 |
| $s_3$ | mA | 20 | 12 | 10.4 | 8 |

By the linearization in $S_4$, $s_3$ will be transformed into $$s_4 = \frac{0.8}{16}(s_3 - 4) + 0.2$$

The signals $s_2$ and $s_4$ after the multiplication in $S_5$ will supply a signal $$s_5 = (s_4 - 0.2) \times (s_2 - 0.2) + 0.2$$

transformed by reversal ($S_6$) into:

$$s_6 = 1 - (s_5 - 0.2).$$

With reference now to FIG. 3, a central station has been there shown for the dosage of the additive in a plant provided with three evaporative systems denoted by A, B and C. Each of said systems A, B and C is connected to a central control station D by means of a group of small sized pipes (about ½") possibly made of plastic material. More precisely, the purposes of said pipes are:

transmitting the pressure differential around the calibrated orifice of the feeding duct for the make up water (two pipes $a$, $a'$)
taking samples of the make up water (one pipe $b$)
taking samples of the blow down water (one pipe $c$)
returning a water stream with the additive (one pipe $d$).

It is to be noted that if the make up water is the same for the three systems A, B and C it will be possible to restrict the number of the pipes to four, eliminating the pipe ($b$). Moreover, also in view of the low cost of the transmitters for the pressure differential, each system could be provided with such transmitter, dispensing with one of the pipes, either $a$ or $a'$, replaced by a single pipe, for instance a ⅛" pipe, for a pneumatic signal 3 - 15 psi. In this case, the bundle of pipes would consist of three components and three main ducts would connect the main control station D to the three pipes of the bundle through solenoid operated valves (E).

The operation of such a centralized control device, could be carried out as follows:

At the start of the cycle, and according to a sequence governed by a timer (not shown), the three valves connecting the system A to the central station D are opened and remain in this condition through a predetermined fraction of the cycle; during this period the conductivity of the water of the system A will be compared with that of the make up water, the flow rate $F_m$ of the make up water will be evaluated and on the base of said values transmitted from the central station to the pump for feeding the additive, the stroke of said pump will be adjusted and thereby will be adjusted also the amount of additive fed to the return pipe ($d$).

When this period has been concluded, the system A will be disconnected by the solenoid valves (E) from the central station D; the connection will be established with the system B for which a cycle similar to that already described for A will be repeated. The same occurs for the system C. If, for instance, a complete cycle of 60 minutes is fixed, three partial periods will be obtained, different for each of the systems, in function of the nominal maximum rate of flow of the make up water; for instance, let the nominal rates of flow be 20, 50, 30 cu.mt/hr for A, B, C, respectively, then:

$$A \text{ will be connected for } \frac{60 \times 20}{20 + 50 + 30} = 12 \text{ min.}$$

$$B \text{ will be connected for } \frac{60 \times 50}{20 + 50 + 30} = 30 \text{ min.}$$

$$C \text{ will be connected for } \frac{60 \times 30}{20 + 50 + 30} = 18 \text{ min.}$$

Only by way of illustrative example, a partical application of a device for controlling the dosage of chemical additives according to the present invention, when applied to the cooling system of a refinery, will be now disclosed.

EXAMPLE

The specifications of the evaporation system are as follows:

| | |
|---|---|
| Nominal maximum rate of flow of the make up water: | 3.0 cu.mt/hr |
| make up water readings: | |
| Total salinity | 400 ppm |
| Total hardness | 268 ppm |
| (Calcium) hardness | 234 ppm |
| Alkalinity | 212 ppm |
| Concentration ratio | 1.5 – 3.0 |
| System capacity | 400 cu.mt |

Chemical additives
Use is made of a compound of the polyol type, the concentration of which is to be maintained, in the system water, at 50 ppm.

Additive feeding pump
Use is made of a piston type pump (65 rpm) the stroke of which is positioned by a pneumatic actuator so as to change the pump flow rate between 0 and 1.7 liters per hours, when the incoming pneumatic signal varies between 15 and 3 psi. (the actuator device is of the reverse response type).

Metering the make up water flow rate
This is done by a calibrated orifice inserted in the 6" duct for feeding the make up water, which at the flow rate of 30 cu.mt/hr gives out a differential pressure of 1000 mm $H_2O$.

This differential pressure ($\Delta p$) will be admitted to a pneumatic transmitter (manufactured by OBSA) giving out a pneumatic signal varying quadratically between 3 psi (when the flow rate is 0) and 15 psi (when the flow rate is 30 cu.mt/hr). This signal is subsequently admitted to a linearizing device (OBSA) where it is processed so as to give out a pneumatic signal linear with the rate of flow of the make up water, and variable within the aforesaid range. This signal is then admitted to one of the two inlets of an analog multipler (Foxboro).

Metering the ratio of the conductivities of the make up water and of the system water.

Two small streams of the make up water and of the system water are respectively fed through ¼" size plastic hoses to two conductivity metering celles consisting of two cylindrical perspex beakers (3" wide and 6" deep), provided with a co-axial hollow cylindrical body (½") into which enter two electrodes consisting of two stainless steel bands 2" apart, so as to allow the easy cleaning thereof. The water enters at the bottom of the beakers and is dumped through a spout at mid height of the beakers. These two cells form two contiguous sides of a Wheatstone bridge completed by a screw adjusted resistor (the third side) and by a variable resistor (the fourth side) comprising a Beckmann potentiometer positioned by a Contraves resolver. This is energized by a direct current signal generated by an amplifier inserted in the "diagonal" of the Wheatstone bridge. The bridge and therefore the conductivity cells, are under an a.c. voltage of 7 V. 50 cycles. These operating conditions, even if unusual, turned out to be satisfactory: the resistivity ratios recorded have been found to be coincident within the 4% limits, with the respective concentration ratios. Also voltages up to 25 V a.c. have been successfully tested.

Coaxial with the fourth variable resistor there is a potentiometer which, energized by a d.c. voltage, gives out a signal which after proper amplification, is the outlet signal in the range of 4 to 20 mA for concentration ratios variable from infinite concentration to 1/1 when the amplification coefficient is 1. Practically this signal is linear to the reciprocal of the concentration ratio. It is admitted to an electropneumatic transmitter (EN1), the outlet from which is a pneumatic signal 3 – 15 psi., linear with the current inlet signal in the range 4 – 20 mA.

The pneumatic signal is then transferred to the analog relay (Foxboro) wherefrom an outlet pneumatic signal is obtained, linear with the product of the two incoming signals. That is when $if$ and $ic$ are the incoming signals relative to the concentration and to the flow rate of the make up water, the outgoing signal $os$ will be:

$$os - 3 = (if - 3) \times (ic - 3).$$

The last step is the reversal of $os$ in order to make it compatible with the characteristics of the pump positioner: $os$ is admitted to a reversing relay (RIV-Moore) the outlet signal from which $or$ is such to satisfy the relation:

$$or - 3 = 15 - os.$$

Equipment of this kind has been in operation for some months and it has maintained a concentration of the additive in the system water corresponding to the desired value (50 ppm).

The present invention has been described with particular reference to certain specific embodiments thereof, but it is to be understood that changes and modifications might be adopted without departing from the scope of the present industrial privilege.

SUMMARY

One essential factor measured is $K_m/K_s$. The signal $s_4$ proportional thereto is the multiplier of $F_m$ in equation (3). Since the signal $s_2$ is proportional to $F_m$, the factors of equation (3) become determinable whereby the product of $s_2 \times s_4$, derived at $S_5$, may be used to control the variable delivery pump proportionally to increase the delivery (flow rate) of the additive.

As to the Wheatstone bridge $R_2/R_1$ is proportional to $K_m/K_s$. If $R_3$ is positioned to the pneumatic equivalent of $s_2$, and since $s_2$ is proportional to $F_m$, then $R_3$ is proportional to $F_m$. Consequently, $R_4$ in equation (4) become proportional to $F_d$ in equation (3). Therefore, by zeroizing $R_4$ (19) in the Wheatstone bridge, the output signal from the potentiometer 24, FIG. 2, is proportional to $F_d$. Thus, by adjusting $R_4$ (19) to the zero or nul position, an electrical signal $s_4$ is emitted which under equation (4) or (5) is the product of $R_3 \times R_2/R_1$, that is, $F_m \times K_m/K_s$.

A liquid equivalent of a pneumatic signal may be used. The resolver 21, FIG. 2, translates the signal from amplifier 23 into mechanical motion for zeroizing the resistor 19. The concentration ratio under the Example is $K_m/K_s$.

The central control station D, figure 3, embodies the means described above for computing values and emitting signals proportional thereto.

We claim:

1. A device for continuously controlling the dosage of a chemical additive in an evaporative system including both make up water and blow down water, and comprising in combination:
   a. means for continuously measuring the make up water flow rate ($F_m$) and for transmitting signals indicating the measured rate of flow:
   b. means for continuously measuring the ratio $K_m/K_s$ of the relative conductivities of the make up water and of the blow down water and for transmitting signals indicative of the measured ratio;
   c. analog means for multiplying said two signals indicative of the values of $F_m$ and of $K_m/K_s$ and for transmitting signals indicative of the product of said two signals; and
   d. pump means of variable stroke for feeding the chemical additive and controlled by the signal derived from said analog means.

2. A device as claimed in claim 1, characterized in that said means (a) for measuring $F_m$ comprises a disc with a central calibrated orifice mounted inside the make up water feed pipe, an instrument detecting the pressure differential ($\Delta p$) between the zone upstream of said disc and the zone downstream thereof, said instrument being connected to said zones by two separate branch pipes and communicating with a square root extractor for linearizing the corresponding signal.

3. A device according to claim 1 characterized in that said means (b) for continuously measuring the ratio $K_m/K_s$ consist of two conductivity cells, each fed separately with a continuous sampling of the make up water and of the blow down water, and forming two contiguous sides $R_1$ and $R_2$ of a Wheatstone bridge the third side of which ($R_3$) consists of a variable resistor, while the fourth side of which ($R_4$) consists of a variable resistor moveable by a zeroing device to produce an output signal, means being also provided for transforming the electric signal given out by said bridge into a pneumatic signal representing the $K_m/K_s$ ratio.

4. A device according to claim 2 characterized in that said means (b) for continuously measuring the ratio $K_m/K_s$ consist of two conductivity cells, each fed separately with a continuous sampling of the make up water and of the blow down water, and forming two contiguous sides $R_1$ and $R_2$ of a Wheatstone bridge the third side of which ($R_3$) consists of a variable resistor, while the fourth side of which ($R_4$) consists of a variable resistor moveable by a zeroing device to produce an output signal, means being also provided for transforming the electric signal given out by said bridge into a pneumatic signal representing the $K_m/K_s$ ratio.

5. A device as claimed in claim 3, characterized in that said zeroing device consists of means responsive to the sensing diagonal of the Wheatstone bridge to adjust the fourth side ($R_4$) to zero and concurrently adjusting a potentiometer which delivers an output electric signal proportional to $K_m/K_s$.

6. A device as claimed in claim 3, characterized in that said third resistor ($R_3$) of the bridge is positioned by a pneumatic device linear with the flow rate $F_m$.

7. A device according to claim 1, characterized in that said analog means (c), comprises a square root extractor and a multiplier.

8. A device as claimed in claim 1, characterized in that the variable stroke of said pump (d) is continuously adjusted by a signal coming from the measuring means for the rate of flow of the make up water $F_m$ and the variable speed of the pump driving motor by the signal coming from the measuring device for the ratio $K_m/K_s$, or vice versa.

9. A device as claimed in claim 6, characterized in that the variable stroke of the pump is directly controlled by the output signal from the Wheatstone bridge, directly proportional to the flow rate of the blow down water.

10. Apparatus for continuous dosage of chemical additives in a plurality of evaporative systems, each system including both make up water and blow down water, and a central control station for the evaporative systems, said station comprising:
   a. means for continuously measuring make up water flow rate ($F_m$) and for transmitting signals indicating the measured rate of flow;
   b. means for continuously measuring the ratio $K_m/K_s$ of the relative conductivities of the make up water and of blow down water and for transmitting signals indicative of the measured ratio;
   c. analog means for multiplying said two signals indicative of the values of $F_m$ and of $K_m/K_s$ and for transmitting signals indicative of the product of said two signals; and
   d. pump means of variable stroke for feeding the chemical additive, with a pneumatic governor of said stroke controlled by the pneumatic signal derived from said analog means;
said apparatus further comprising a group of main pipes extended from said control station and group of secondary pipes extended respectively from each of said evaporative systems, valve means for connecting sequentially the pipes in the main group respectively to pipes in the secondary groups, there being five pipes in each group as follows: two pipes enabling the central control station to measure $F_m$, the third pipe being a sampling pipe for the make up water, the fourth pipe being a sampling pipe for the blow down water, and the fifth pipe being a return pipe for the water containing the additive; the sequence of the time intervals of connection of said main group of pipes to said secondary pipes and the duration of said intervals being governed by a timer proportionally to the maximum nominal rates of flow of the make up water in the different evaporative systems.

11. Apparatus for continuous dosage of chemical additives in a plurality of evaporative systems, each system including make up water derived from a common source and blow down water, and a central control station for the evaporative systems, said station comprising:
   a. means for continuously measuring make up water flow rate ($F_m$) and for transmitting signals indicating the measured rate of flow;
   b. means for continuously measuring the ratio $K_m/K_s$ of the relative conductivities of the make up water and of blow down water and for transmitting signals indicative of the measured ratio;
   c. analog means for multiplying said two signals indicative of the values of $F_m$ and of $K_m/K_s$ and for transmitting signals indicative of the product of said two signals; and
   d. pump means of variable stroke for feeding the chemical additive, with a pneumatic governor of said stroke controlled by the pneumatic signal derived from said analog means;
said apparatus further comprising a group of main pipes extended from said control station and group of secondary pipes extended respectively from each of said evaporative systems, valve means for connecting sequentially the pipes in the main group respectively to pipes in the secondary groups, the pipes in each group comprising: a sampling pipe for the blow down water and a return pipe for the additive.

12. A method for continuously controlling the dosage of a chemical additive in an evaporative system including both make up water and blow down water, and comprising the steps of:
   a. continuously measuring the make up water flow rate ($F_m$) and originating an analog indicating the measured rate of flow;
   b. continuously measuring the ratio $K_m/K_s$ of the relative conductivities of the make up water and of the blow down water and originating an analog indicative of the measured ratio;
   c. multiplying said two analogs indicative of the values of $F_m$ and of $K_m/K_s$ and originating an analog of the product;
   d. and, in accordance with said product, varying the delivery of a variable pump for feeding the chemical additive.

* * * * *